Patented Dec. 23, 1952

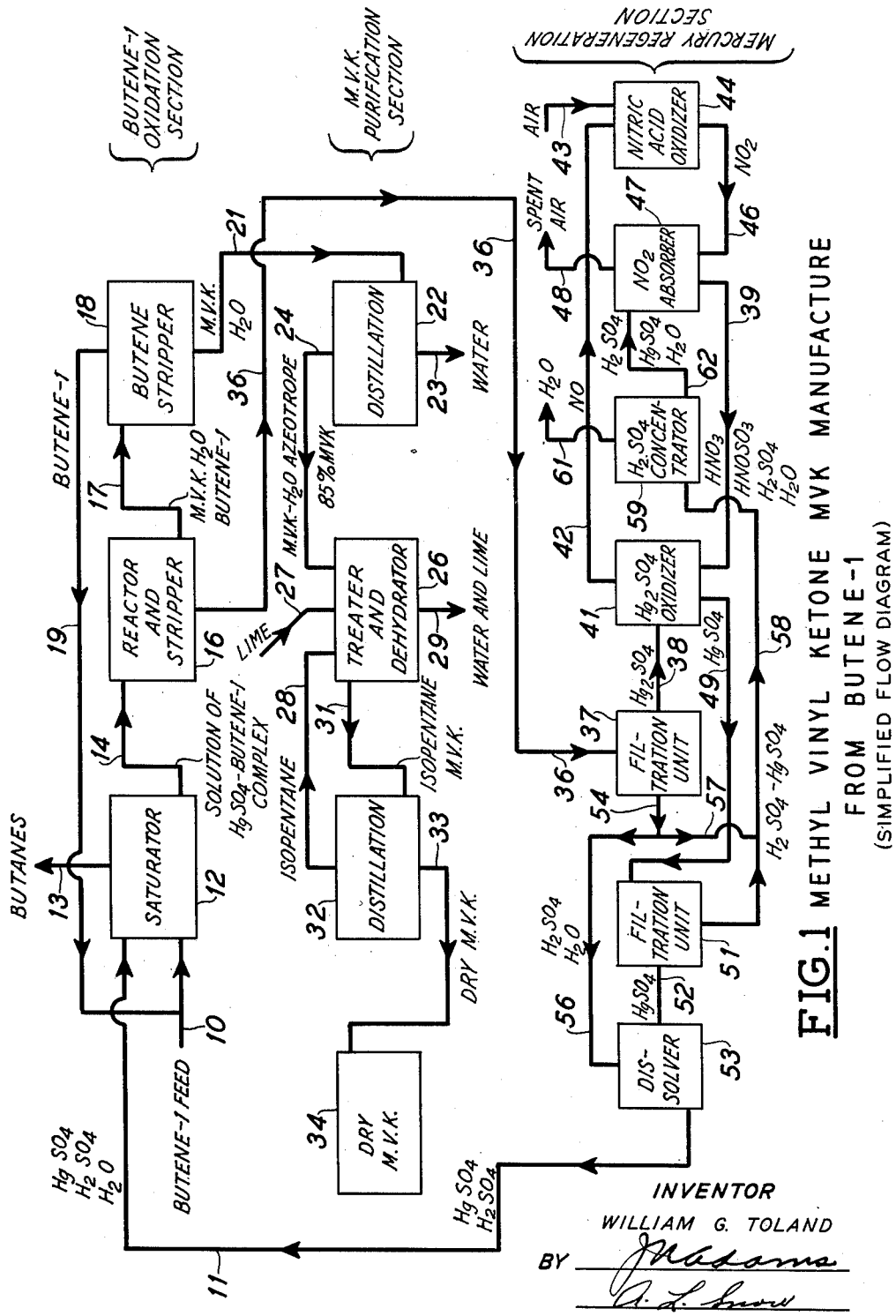

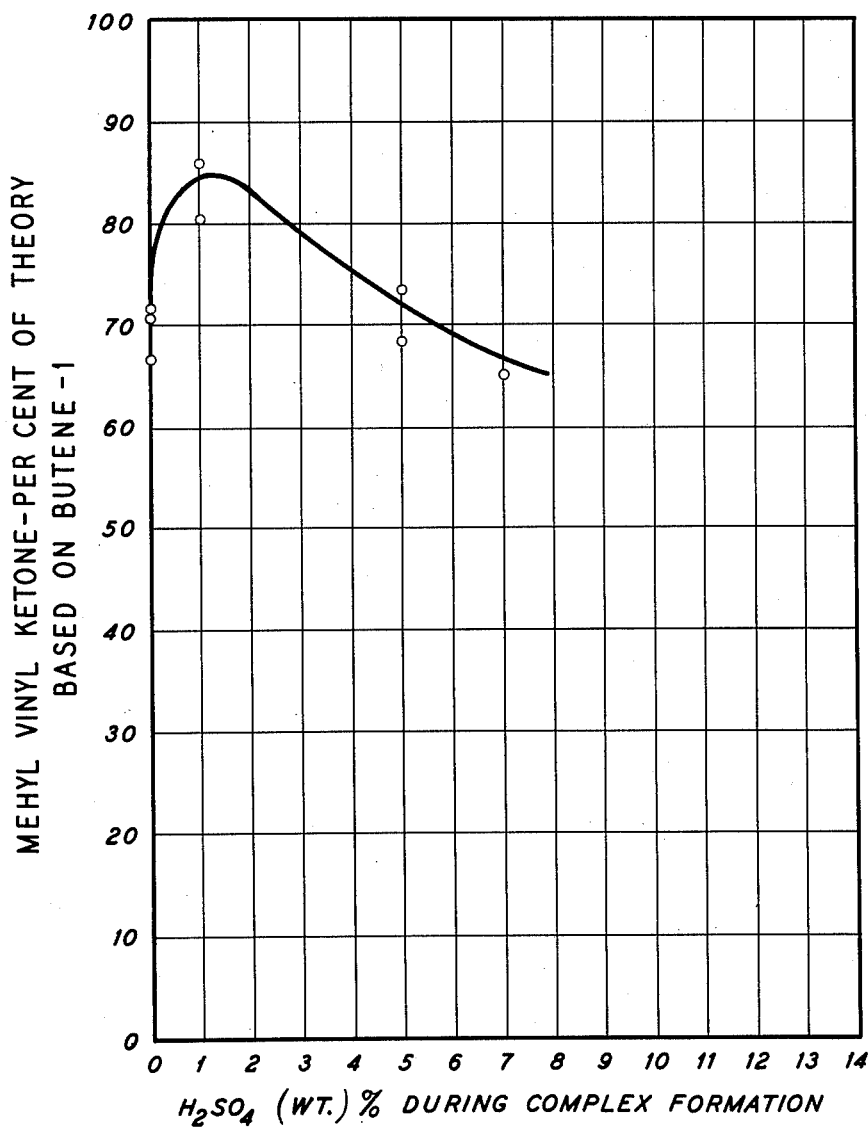
FIG. 2 INFLUENCE OF AMOUNT OF $H_2SO_4$ PRESENT AS BUTENE-1 MERCURIC SULFATE COMPLEX IS FORMED AT 70°F ON YIELD OF METHYL VINYL KETONE.

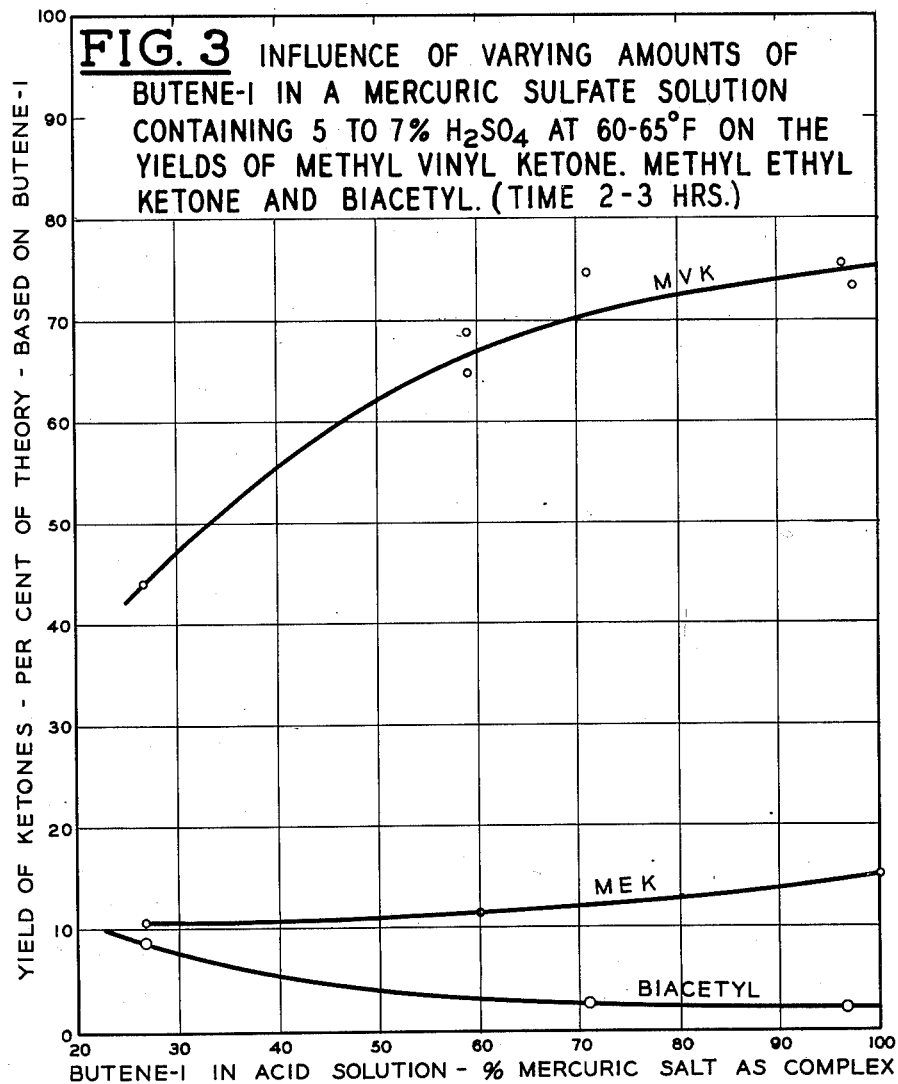

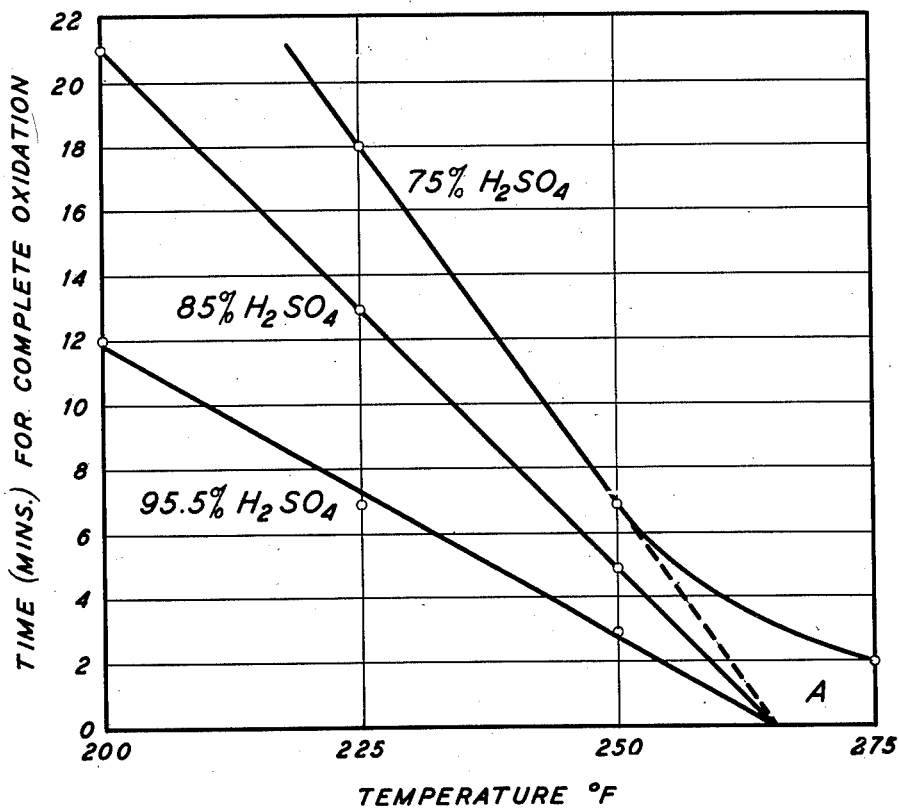
FIG.4 INFLUENCE OF SULFURIC ACID CONCENTRATION AND TEMPERATURE ON THE TIME REQUIRED TO OXIDIZE MERCUROUS SULFATE TO MERCURIC SULFATE WITH NITROGEN DIOXIDE.

2,623,073

UNITED STATES PATENT OFFICE 2,623,073

PREPARATION OF UNSATURATED KETONES

William G. Toland, Richmond, Calif., assignor to California Research Corporation, San Francisco, Calif., a corporation of Delaware Application December 21, 1946, Serial No. 717,654

1 Claim. (Cl. 260—597)

The present invention relates to the production of ketones having the carbonyl group alpha to a double bond carbon and having a terminal methylene group by liquid phase oxidation of 1-olefins.

Methods are available for oxidizing the terminal carbon of propylene to the corresponding aldehyde acrolein, but the problem of liquid phase oxidation of olefins and particularly the liquid-phase oxidation of the carbon not occurring as terminal or on the double bond has not been satisfactorily solved. Usually in such oxidations, reaction either takes place at the double bond, undesirable quantities of a saturated ketone is produced, or the oxidation proceeds to the formation of too much diketones. It becomes evident, therefore, that a method of directing and controlling the oxidation of 1-olefins to such unsaturated ketones would substantially advance the prior art.

It is an object of this invention to prepare ketones having the carbonyl group alpha to a double bond carbon and having a terminal methylene group by liquid phase oxidation of 1-olefins.

It is an additional object of this invention to oxidize 1-olefins to such unsaturated monoketones during an induction period, said induction period substantially preventing the formation of saturated ketones.

It is another object of this invention to prepare alpha unsaturated ketones having a terminal methylene group by liquid-phase oxidation of 1-olefins during an induction period and controlling the degree of oxidation of said 1-olefin to substantially prevent the formation of diketones.

It is a further object of this invention to prepare such ketones from an economical refinery stream fraction treated to remove olefins interfering with said ketone productions such as butene-2 and isobutylene.

It is an additional object of this invention to selectively oxidize butene-1 in a hydrocarbon stream containing butene-1 and butene-2.

It is a still further object of this invention to prepare methyl vinyl ketone from an economical four carbon refinery stream fraction containing butene-2, whereby said butene-2 is converted to butene-1 and thereby available for oxidation to methyl vinyl ketone.

It is another object of this invention to provide a method of removing substances from the olefin gas stream which tie up the oxidizing agent making it unavailable for re-use in the oxidation of 1-olefins.

Additionally, it is an object of this invention to provide a method for oxidizing 1-olefins substantially to vinyl ketones and treat said ketones to remove color bodies therein.

Another object is to provide a method for removing water from said unsaturated ketones formed during oxidation of said olefins.

A still further object is to provide a method of reoxidizing the oxidizing agent reduced in the oxidation of the said olefins.

Another object is to provide a method of obtaining a 1-olefin in high purity.

A further object resides in providing a method for separating paraffins from olefins.

Briefly stated, the process consists of a method of manufacturing an unsaturated alpha ketone having a terminal methylene group which comprises forming a mercuric complex by contacting a 1-olefin with an aqueous solution or dispersion of an oxidizing agent in a first reaction stage, said oxidizing agent being a mercuric compound capable of forming a complex with said olefin, and thermally decomposing said complex in a second reaction stage to form said ketone and inhibiting formation of diketones in said decomposition stage by converting at least 25% of said mercuric salt to said olefin complex prior to initiating decomposition of the complex, and reducing contamination of said unsaturated ketone with saturated monoketone by effecting both formation and decomposition of said complex within the inhibition period for saturated monoketone formation.

The general reactions occurring, for example, in the case of 1-butene may be illustrated as follows:

Reaction A:
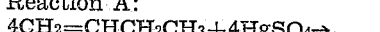
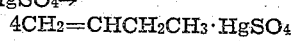

Reaction B:
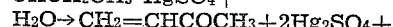
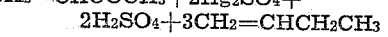

Reaction A is carried out first in the low temperature complex-formation zone of the process and reaction B is carried out in the high temperature complex-decomposition zone of the process steps.

It is seen that one molecule of olefin can combine with one molecule of mercuric salt. In such a case, all (100 per cent) of the mercuric salt exists as olefin complex. However, since under such conditions 75 per cent of the olefin complexed is reliberated in reaction B, it follows that if sufficient olefin is added to form complex with only 25 per cent of the mercuric salt in reaction A, the same reaction could occur in B, since four molecules of mercuric salt are needed to oxidize the olefin to unsaturated ketone occurring on 25 per cent of the mercury salt. Obviously, under such conditions no olefin would be reliberated from the complex. We prefer to operate with at least enough olefin complexed in reaction A to reduce all the mercuric salt present in the reaction chambers to mercurous salts in reaction B. For example, we prefer at least 25 per cent of the theoretical amount of olefin added that can form complex. However, for reasons that will become evident, it is more satisfactory to add sufficient olefin to complex with 50–70 per cent of the mercuric sulfate present.

The foregoing reactions are finite in rate and require an appreciable time interval for completion. This time interval is hereinafter termed "induction period for unsaturated ketone formation" and designates that period of time required for formation of 1-olefin complex plus the time for decomposition of said complex to an alpha ketone having a terminal methylene group.

In making unsaturated ketones by reactions A and B, it has been found that formation of saturated ketones is a competing reaction. The exact mechanism of this competing reaction has not been established, but it is thought that the olefins first are hydrated to saturated alcohols which in turn are oxidized to saturated ketones with resultant contamination of the desired unsaturated ketone product. It has been discovered that the reactions by which saturated ketones are formed have an inhibition period. This term "inhibition period" is herein used to designate that interval of time within which the amount of saturated ketone formed is less than about 5% of theoretical.

An important feature of this invention involves the discovery that by proper control of process conditions, principally temperature, the induction period for unsaturated ketone formation can be maintained below the inhibition period for saturated ketone formation to yield an unsaturated ketone of desired purity.

In accordance with the invention, certain operating factors have definite limits in the induction period. For example, sufficient olefin is added to the mercuric sulfate acid medium to convert at least 40 to 95 per cent of the mercuric salt to olefin complex in reaction A, thereby leaving no mercuric sulfate available after reaction B to oxidize the ketone to the diketone. Additionally, in accordance with the invention, the conditions under which the complex is formed and held must be correlated within certain temperature and time limits. Furthermore, according to my invention, the conditions under which the complex is decomposed is also preferably correlated within certain prescribed limits of temperature and time.

The procedure is preferably and conveniently carried out in a two-step cold complex formation and hot decomposition process having two reaction chambers. In the first chamber the oxidizing agent medium is preferably adjusted to certain degrees of saturation with 1-olefin within said inhibition period to form an olefin oxidation agent complex. In the second reaction chamber said complex medium is instantaneously brought to the boiling point still within said inhibition period, to prevent undesirable side reactions such as the formation of saturated ketones, and to decompose said complex and form the desired unsaturated ketone and a corresponding reduction product of the oxidation agent.

These two chambers may be referred to as the olefin-complex forming chamber and the olefin-complex decomposing chamber, respectively. A preferred method of operation comprises adding the olefin-containing gas at such a rate and temperature that the oxidizing agent becomes about 40 to 95 per cent complexed within the inhibition period.

Operating with at least 25 per cent of the mercuric salt in the form of olefin complex leaves little available to carry the oxidation reaction too far, such as the oxidation of ketone to diketone, and saturating below 60° F. and preferably between 40° F. and the freezing point prevents undesirable reactions such as the formation of saturated ketones.

The addition of sufficient olefin to unite with 40 to 95 per cent of the oxidizing agent results in the formation of the complex illustrated in reaction A. In the low temperature chamber during formation of said olefin complex, the unreactive liquid or gaseous paraffin hydrocarbons separate from the reaction mixture by suitable methods such as decantation or vaporization, thereby providing a means of separating paraffins from olefins. The olefin fraction now bound to the mercury salt during the induction period is conducted to the complex decomposing chamber maintained in the temperature range of 180° F. to 240° F. where the complex is instantly broken to form the ketone, as illustrated in reaction B.

Since four equivalents of mercuric sulfate are required to oxidize one equivalent of olefin, it follows that at 100 per cent reaction of the mercury (complexed as in reaction A) only 25 per cent of the olefin bound in said complex is oxidized to ketone. The remaining 75 per cent of olefin in the complex reverts to free purified 1-olefin and may be either recycled back to the first reaction chamber to unite with more oxidizing agent, or may become a source of purified olefin for other purposes such as the preparation of olefin oxides such as butylene oxide.

Said portion of induction period dealing with olefin-mercuric sulfate-complex formation and methyl ethyl ketone formation varies with temperature and time as shown in Table I.

TABLE I

*Influence of time and temperature at which a butene-1-mercuric sulfate complex is formed and held on the production of methyl ethyl ketone*

| Time (Hrs.) | Temp., °F. | Methyl Ethyl Ketone in Total Ketone, Wt. Percent |
|---|---|---|
| 1 | 18–22 | 0.0 |
| 1 | 40 | 0.0 |
| 1 | 70 | 8.0 |
| 1.5 | 20 | 2.7 |
| 7.0 | 60 | 9.2 |
| 7.0 | 40 | 7.7 |
| 24 | 40 | 13.5 |
| 65 | 40 | 16.4 |

The data show that subjecting butene-1-mercuric sulfate complex to a temperature of 18 to 22° F. for 1 hour gives none of the saturated compound methyl ethyl ketone, whereas subjecting said complex to this temperature for 1.5 hours results in 2.7 per cent of methyl ethyl ketone in the final reaction products. Likewise, the data show that if said complex is held at 70° F. for 1 hours, as much as 8 per cent of the saturated ketone appears in the desired unsaturated ketone product. Additionally, the table shows that longer periods and higher temperatures produce still greater amounts of the undesired methyl ethyl ketone.

Additionally, we have discovered that even after the complex is preferably formed under said conditions of low temperature and short time, additional precautions must be exercised in the decomposition of said complex to the unsaturated ketone. For example, it has been discovered that unless the temperature of said complex is almost instantaneously brought to the boiling point, substantial amounts of saturated ketone may form, that the unsaturated ketone may be destroyed by the acid, or the oxidation may be carried too far. Operating conditions (Table II) in which a butene-1-mercuric sulfate complex is quickly brought to boiling temperature, held at such temperature for a few minutes while methyl vinyl ketone is stripped out, immediately chilled to below room temperature, filtered, washed and analyzed shows the distribution of methyl vinyl ketone and indicates the speed with which reaction B occurs.

TABLE II

*Influence of reaction time at 212–215° F. on reaction B. (Distribution of methyl vinyl ketone)*

| Reaction Time—min | 3–4 | 5–6 | 5–6 | 5–6 |
|---|---|---|---|---|
| Methyl Vinyl Ketone stripped during reaction, percent | 48.6 | 75.8 | 73.2 | 80.0 |
| Methyl Vinyl Ketone: | | | | |
| from Filtrate, percent | 45.2 | 16.6 | 18.0 | 17.5 |
| from Hg$_2$SO$_4$ wash water, percent | 3.8 | 5.9 | 6.5 | 2.2 |
| from Hg$_2$SO$_4$ after wash, percent | 4.2 | 1.7 | 2.3 | 0.3 |
| Number of Washes | 1.0 | 1.0 | 2.0 | 5.0 |

Examples of how the invention may be carried out are shown by the following:

EXAMPLE I

A stream of butene-1 is passed into a stirred suspension comprising about 40 parts by weight of mercuric sulfate and 60 parts by weight of a 1% aqueous solution of sulfuric acid at such a rate that the absorption of butene-1 is practically complete, the temperature of the absorption reaction is maintained at 35° F. within the induction period for unsaturated ketone formation. When the reaction is complete the products are transferred to a second reaction chamber in such a manner as to rapidly form, liberate and remove methyl vinyl ketone as by bringing the slurry to the boiling point by adding the reaction products to 1000 parts of stirred boiling 10% sulfuric acid through which steam is passing. The methyl vinyl ketone as formed is thereby continuously and rapidly removed within the inhibition period for saturated ketone formation.

EXAMPLE II

Pentene-1 is reacted with a sulfuric acid solution of mercuric sulfate using the procedure in Example I. The product is ethyl vinyl ketone.

EXAMPLE III

Octene-1 is reacted with a sulfuric acid solution of mercuric acetate using the procedure in Example I. The product is pentyl vinyl ketone.

EXAMPLE IV

The olefin-complex formation chamber is charged with 1100 parts of water and 1100 parts of mercuric sulfate containing 3 weight per cent of sulfuric acid. To this mixture at 60° F. is added a gas comprising 87.1 per cent butene-1 and 4.52 per cent butene-2. Said gas is added until 60 per cent of the mercuric sulfate has formed the butene-1 mercuric sulfate complex. After being held 30 minutes the butene-1 mercuric sulfate reaction mixture is then transferred during 30 additional minutes to the olefin-complex decomposition chamber containing a solution of hot 12 per cent sulfuric acid from the previous run, while simultaneously stripping with steam to remove ketones, at such a rate as to decompose the complex as added, thereby liberating olefins, ketones and water as vapor. Stripping is continued one-half hour after all slurry is added. The methyl vinyl ketone and water are condensed in a water condenser and the liberated butene-1 is condensed in a trap cooled by Dry Ice. Total ketone yield based on 1-butene and 2-butene in the feed is 97–99 per cent of theory of which 93 per cent is methyl vinyl ketone, 4 per cent is methyl ethyl ketone and 3 per cent is biacetyl.

EXAMPLE V

The olefin-complex formation chamber is charged with 1100 parts of water and 1100 parts of mercuric sulfate containing 3 weight per cent of free sulfuric acid. To this mixture at 60° F. is added a gas comprising 87.1 per cent butene-1 and 4.52 per cent butene-2. Said gas is added until 60 per cent of the mercuric sulfate has formed the butene-1 mercuric sulfate complex.

After being held 30 minutes the butene-1 mercuric sulfate reaction mixture is transferred during 30 additional minutes to the olefin-complex decomposition chamber containing a solution of hot 12 per cent sulfuric acid from the previous run, while simultaneously stripping with steam to remove ketones, at such a rate as to decompose the complex as added thereby liberating olefins, ketones, and water as vapor. Stripping is continued one-half hour after all slurry is added. The methyl vinyl ketone and water are condensed in a water condenser and the liberated butene-1 is condensed in a trap cooled by Dry Ice. Condensate (1170 cc.) containing 5.08 per cent of methyl vinyl ketone is obtained. This is equivalent to 59.4 grams of 95 mole per cent based on mercuric sulfate.

A preferred method of oxidizing an olefin to a ketone by the cold absorption process may be carried out by the details shown in Figure 1. In this flow process a 1-olefin such as butene-1 which may contain paraffins is conveyed by line 10 to saturator 12. Similarly, the oxidizing medium which may consist of mercuric sulfate, sulfuric acid and water is conveyed by line 11 to saturator 12. The absorption of butene-1 in the mercuric sulfate acid mixture is carried out at a temperature below 68° F. and preferably below 40° F. to prevent hydration of the olefin such as butene-1 which would lead to methyl ethyl ketone contamination of methyl vinyl ketone. Paraffins, such as butane, leave the system by line 13. The solution of mercuric sulfate-butene-1-complex leaves the saturator via line 14 and is transferred to reactor and stripper 16, held at a temperature of about 180° F. to about 240° F. wherein said addition product is decomposed to form the desired methyl vinyl ketone. Said ketone, water and liberated olefin by line 17 is conveyed to stripper 18 where the ketone and water are separated from the liberated olefin which returns by lines 19 and 10 to the saturator to form more mercuric sulfate-olefin-complex.

Line 21 carries the reaction products comprising 5 to 20% of ketone such as methyl vinyl ketone and water to the distillation unit 22 where part of the water is removed at line 23. The ketone rich azeotrope is conveyed by line 24 to dehydrator 26. Lime (CaO) in the amount of 0.1 per cent by weight, serves to throw color bodies into the water layer and enters the dehydrator by line 27. A hydrocarbon boiling in a suitable range, such as isopentane, enters by line 28 and serves to extract the ketone from the water. The lime, water, and color bodies leave the dehydrator by line 29 and the hydrocarbon-ketone liquid such as isopentane and methyl vinyl ketone are conveyed from the dehydrator to distillation unit 32 by line 31. The hydrocarbon is recycled to the dehydrator by line 28 while the dry ketone is conveyed by line 33 to storage 34.

The spent oxidation mass consisting of the reduced salt such as mercurous sulfate, an oxygen-containing acid such as sulfuric acid and water, leaves the reactor 16 and is conveyed by line 36 to filtration unit 37. Part of the filtrate consisting of the acid and water are conveyed by lines 54 and 56 to dissolver 53 where they contact mercuric sulfate and are recycled to the saturator 12 by line 11. The separated mercuric sulfate from filtration unit 37 is conveyed by line 38 to the oxidizer 41 where it is oxidized to mercuric sulfate and conveyed by line 49 to filtration unit 51 and then recycled to the saturator as already described.

The reduced form of the oxidizing agent such as mercuric sulfate may be re-oxidized by any suitable procedure. A preferred method consists of a solution containing nitric acid, nitrosyl sulfuric acid, sulfuric acid and water at 200–275° F. fed to oxidizer 41 by line 39. The nitrogen oxides oxidize the mercurous sulfate and said nitrogen oxides in a reduced state are conveyed by line 42 to oxidizer 44 and re-oxidized by air at a temperature of about 70° F. Air enters oxidizer 44 by line 43 and line 46 conveys the oxidized nitrogen oxide to absorber 47 which separates said oxidized nitrogen oxide from the spent air. The spent air leaves absorber 47 by line 48. The oxides are adsorbed in concentrated sulfuric acid in absorber 47 to yield the original oxidizing mixture of nitric acid, nitrosyl sulfuric acid and sulfuric acid. They are then recycled through line 39 to oxidizer 41.

The re-oxidized $HgSO_4$ and oxidizing mixture from oxidizer 41 is sent to a filter unit 51 by line 49, and the $HgSO_4$ removed and sent to dissolver 53 through line 52. The spent sulfuric acid mixture is conveyed by line 58 and reconcentrated in unit 59 before recycling to the nitrogen dioxide absorber by line 62.

The data in Figure 2 show the influence of the amount of sulfuric acid present as the butene-1-mercuric sulfate-complex is formed at 70° F. and broken at 215° F. on the yield of methyl vinyl ketone. The data disclose the yield of methyl vinyl ketone to be as high as 85 per cent and critical in the range of 0.25 to 3.0 weight per cent of acid. Lower complex formation temperatures displace the curve upwards so it approaches yields of 100 per cent of theory at 40° F. and 1 per cent sulfuric acid.

The data in Figure 3 show the influence of the degree the mercuric salt is complexed at 5 to 7 per cent sulfuric acid at 60 to 65° F. on the yields of methyl vinyl ketone and biacetyl. The data show that adding butene-1 to the medium to the level of 40 per cent of the mercuric salt as complex gives yields of 56 and 5.5 per cent of theory of methyl vinyl ketone and biacetyl, respectively, based on butene-1. However, by adding butene-1 to the medium to the level of 100 per cent of mercuric salt complexed yields of 76 and 2 per cent of theory of methyl vinyl ketone and biacetyl, respectively, based on butene-1 are obtained. Lowering the temperature below 65° F. during complex formation and reducing time for complex formation and decomposition to less than 1.5 hours, lowers the curve for methyl ethyl ketone formation and raises that for methyl vinyl ketone formation so that below 40° F. conversions to methyl vinyl ketone approach 98% of theory.

A preferred method of re-oxidizing the oxidizing agent is disclosed in Figure 4 wherein the influence of sulfuric acid concentration and temperature on the time necessary to oxidize mercurous sulfate to mercuric sulfate with nitrogen dioxide is shown. In the temperature range of 200 to 275° F. a period varying only a few seconds to 20 minutes, respectively, are necessary to completely oxidize the mercurous sulfate to mercuric sulfate. While this is a preferred method, the process is not limited to this procedure.

Products emerging from the low temperature complex-forming chamber may consist of the olefin-oxidizing-agent-complex, water, acid, unreacted oxidizing agent and inert gases present in the olefin source, such as paraffins.

Products emerging from the high temperature complex decomposition chamber may consist of the ketone formed, acid, a reduced form of the oxidizing agent, a small amount of unreduced oxidizing agent, small and varying quantities of diketone, the liberated purified olefin, varying quantities of 2-olefin depending on whether the isomerization step is practiced, and small varying quantities of the difficulty decomposable iso-olefin complex such as isobutylene mercuric sulfate complex.

A typical refinery stream containing olefins suitable for oxidation to methyl vinyl ketone usually contains varying amounts of butane, isobutane, butene-1, butene-2 and isobutylene. It has been discovered that the oxidation of butene-1 in such a feed stock with mercuric sulfate shows no oxidation of the butene-2 fraction under proper induction period conditions. In fact, it has been discovered that by suitable control the butene-2 may be retained unchanged in this selective oxidation reaction step and separated as such. Recycle of butene-2 with the butene-1 stemming from the decomposing mercuric sulfate olefin complex is possible but such butene-2, if present in appreciable quantities in refinery streams, accumulates and dilutes the recycle butene-1 stream and ultimately seriously interferes with the oxidation of butene-1 to methyl vinyl ketone. Additionally, butene-2 tends to form methyl ethyl ketone which complicates purification and recovery.

Another problem is presented by isobutylene present in the flow stream during the oxidation of butene-1 in an induction period. Said isobutylene forms a mercuric-sulfate-butylene-complex so stable it is not decomposed during said unsaturated mono-ketone formation from butene-1 complex. Since this complex is not decomposed, part of the oxidizing agent is removed from participation by being tied to a stable complex. As such the stable complex circulates with the reduced portion of the oxidizing agent and must be burned out during reoxidation of the oxidizing agent at additional expense. Such treatment is costly and disturbs the timing and economy of the process. This poses the problem of either removing said isobutylene from the feed or treating said stable complex by some procedure sufficiently drastic to liberate the oxidizing agent thereby making it available for reuse.

It is, therefore, an additional part of this invention to solve the butene-2 and isobutylene problems by conditioning a suitable refinery stream such as one containing substantially three and four carbon compounds such as propylene, butane, isobutane, butene-1, butene-2 and isobutene making it suitable for oxidation of 1-olefin to unsaturated ketones. In such a refinery stream the three carbon fraction is substantially removed as heads by fractionation. The bottoms from said fractionation column consisting essentially of the four carbon fraction is sent to a super fractionator which removes about 95% of the trans-butene-2 and about 99.5% of the cis-butene-2 as bottoms. Said 2-butenes may then be isomerized to butene-1 by a convenient catalyst such as copper oxide or nickel on Porocel at a temperature of 600 to 1,000° F. The products of said isomerization step may be passed through the later described sulfuric acid adsorption chamber to separate any isobutane formed during isomerization of butene-2 to butene-1.

The overhead from said super-fractionator containing paraffins, butene-1 and isobutylene is passed through 60% sulfuric acid preferably maintained below 100° F. to selectively absorb isobutylene, thereby purifying said hydrocarbon stream now containing substantially butene-1, capable of being oxidized to methyl vinyl ketone by mercuric sulfate and varying amounts of compounds unreactive under said preferred condition to mercuric sulfate, such as butane, isobutane and any small amount of butene-2 not removed by the super-fractionating column or not isomerized.

However, if butene-2 is wanted in volume in a purified form, the isomerization step may be omitted for it has been discovered that butene-1 and butene-2 are absorbed in an aqueous dispersion containing a mercuric compound which forms a complex with butene-1, said complex thermally decomposing in a second reaction stage to selectively oxidize butene-1 to an unsaturated ketone while separating butene-2 without substantial oxidation by decomposing said complex and vaporizing said absorbed butene-2, the oxidation of butene-2 being prevented during butene-1 oxidation within the induction period for unsaturated ketone formation and within the inhibition period for saturated ketone formation. The concentrated butene-2 may be removed from the recycle flow stream by conventional methods.

Many additional operating steps in the flow sheet either are quite critical or may be operated under certain specified conditions as follows:

Oxidizing agents

Other mercury salts than mercuric sulfate such as mercuric phosphate and mercuric acetate, have been found to give results. However, the sulfate is preferred, since it presents fewer problems and gives good results. It is to be understood that the physical characteristics of the various oxidizing agents contemplated by the invention will depend upon their concentration in the aqueous medium and may appear as an aqueous dispersion or as a solution. For the sake of clarity in the description of the invention in the specification and claims, reference will be made to the term "dispersion" which is to be interpreted in a generic sense embracing molecular as well as colloidal dispersions.

Ratio of sulfuric acid to mercuric sulfate

The reduction of mercuric sulfate is attendant with the production of sulfuric acid. The greater the concentration of mercuric sulfate, the more sulfuric acid is formed.

The following table shows the correlation between mercuric sulfate concentration and the acid concentration obtained by the decomposition of an olefin mercuric sulfate slurry:

| $HgSO_4$ in Slurry in Saturator, Percent | $H_2SO_4$ Formed in Reactor, Percent |
|---|---|
| 10 | 1.8 |
| 30 | 6.6 |
| 50 | 14.3 |
| 60 | 19.8 |
| 70 | 27.8 |

The composition of the mercuric sulfate slurry (oxidizing mass) may be varied over a wide range with the mercuric sulfate comprising over 70 weight per cent. However, inasmuch as free sulfuric acid is formed in the reaction, the more concentrated the mercuric sulfate, the stronger the resulting acid solution as the complex decomposes. Additionally, the stronger the resulting acid solution, the more easily said acid solution is concentrated in the catalyst regeneration unit. However, strong sulfuric acid solutions destroy the ketone and low yields result, whereas with little or no acid present in the slurry, the rate of decomposition of the complex on heating is too low for desired results. The balancing of these factors dictate a slurry in an operative range containing about 3–70 weight per cent of mercuric sulfate. A preferred range comprises about 20 to 60 weight per cent of mercuric sulfate while the optimum range comprises 45 to 55 weight per cent of mercuric sulfate. The latter introduces about 12 to 17 per cent sulfuric acid in the olefin-complex decomposition chamber.

Temperature

The temperature of the mercury-olefin complex forming chamber for unsaturated mono-ketone formation may be operated below 60° F. and preferably should be kept in the range of 50° F. to the freezing point. However, the optimum temperature for mercury-olefin-complex formation is from 40° F. to the freezing point.

We have found that appreciably higher temperatures than 40° F. favors the competing reaction, namely the hydration of the olefin to the alcohol. This competing reaction becomes quite marked in the presence of sulfuric acid at elevated temperatures. If this reaction is allowed to occur the alcohol so formed is oxidized to the saturated ketone during the high temperature complex decomposition period. In order to avoid contamination of the unsaturated ketone with such undesirable products, conditions of time, temperature and concentration are so controlled as herein already referred to by carrying out said reaction in the induction period for unsaturated ketone formation within the inhibition period for saturated ketone formation to decrease or prevent the formation of said competing reaction and simultaneously permit the desired oxidation reaction to proceed at maximum rate. However, in the case of a pure olefin feed, both complex forming and complex decomposing reactions may be simultaneously carried out in one chamber in an induction period for unsaturated ketone formation within an inhibition period for saturated ketone formation.

*Degree of saturation of olefin in the dilute acid mercuric salt solution*

The olefin unites with the oxidizing agent to form a complex in a 1:1 molar ratio of olefin to mercuric sulfate. However, only 25% of said olefin on the complex is oxidized to ketone, the rest being reliberated as olefin.

In order to direct and control said oxidation of olefin to said unsaturated mono-ketone, it becomes desirable to add more olefin than can react with the available mercuric sulfate to insure removal of substantially all of the mercuric sulfate and thereby keep diketone formation at a minimum. At the same time it is desirable to refrain from adding considerably more olefin than will theoretically react, to keep adsorption time at a short practical period. In the solution of these problems it has been discovered that olefin to the extent of 40 to 95 per cent of that capable of complexing with the oxidizing agent comprises an operative range, whereas 50 to 85 per cent comprises a preferred range and 60 to 80 per cent comprises an optimum range for keeping the yield of diketone low without adversely affecting unsaturated mono-ketone yield.

An additional advantage derived from complexing more than 25 per cent of the mercuric sulfate with olefin is the discovery that the induction period is decreased as more of the mercury salt is complexed. However, the higher the concentration of complex the greater the tendency for the hydration reaction to proceed. Balancing of these factors gives an optimum range of 60 to 80 per cent of the mercuric salt complexed.

*Flow rates to the olefin complex forming chamber*

The rate at which the olefin is fed to the olefin-mercuric sulfate-complex forming chamber depends on the concentration of olefin in the gas feed. A gas containing about 25 per cent olefin at a temperature of about 60° F. has shown that one thousand grams of oxidizing medium containing 22.2 per cent mercuric sulfate will absorb 95 per cent of 2 moles of 1-butene per hour. The reaction is very rapid, the contact time being about four seconds. Since the absorption process is exothermic, the chamber preferably should be cooled during absorption of the olefin to keep the temperature down. This may be accomplished by means of cooling coils, a cooling jacket, flowing the olefin from a high pressure line to a low pressure absorption chamber, thereby utilizing the cooling attendant with vaporization, or any other suitable cooling process or device.

With a relatively pure olefin feed, butene rates have been used, at room temperature, with good absorption results in the range of 0.5 to 4.5 moles per hour which corresponds to a range of from 49 to 437 volumes of gas per volume of complex-forming chamber per hour. The maximum rate of absorption was not reached.

*Flow rates to the olefin complex decomposition chamber*

Solutions of the complex have been passed up to 8600 grams per hour or about 30 volumes of liquid containing the complex per volume of reaction chamber. The maximum rate was not reached. A preferred procedure is to add the olefin complex at such a rate and under such conditions that it rapidly and preferably instantly reaches the boiling point.

*Decomposing the olefin-mercuric sulfate complex*

The most critical factor relating to the decomposition of the olefin-mercuric sulfate complex to form unsaturated ketone and liberated olefin is the speed with which said complex is heated to the reaction temperature of about 180–240° F., and the speed with which the unsaturated ketone is removed from the reaction zone.

Very good results have been obtained by heating the reaction chamber by a steam jacket and adding new complex to the boiling slurry from which the complex is decomposed while simultaneously stripping with steam. The stripping steam removes the unsaturated ketone and excess olefin from the acid mass, as formed, thereby diminishing further undesirable reactions.

The evolution rate of the pure unoxidized olefin is very rapid and is completed in a few seconds after the complex reaches a temperature of about 215° F. Evolution of the unsaturated ketone is slower, 80% being stripped out in 6 minutes at boiling temperature. (Table II.) The remainder is largely removed after 1 hour of stripping. The use of higher temperatures and pressure may be used to cut down stripping time. An alternative to the final stripping in a separate unit consists of retaining the last 20% of unsaturated ketone in solution until the mercurous sulfate is filtered off, then flashing it off in a film vacuum concentrator while concentrating the sulfuric acid.

*Yields*

Yields of 90–98 per cent of theory of unsaturated ketones based on 1-olefin have been obtained.

While the process has been illustrated by numerous examples, it will be apparent to those skilled in the art that various modifications may be made in carrying out the process while retaining the benefits of the discoveries herein disclosed.

Additionally, the method is applicable to other olefins than butene-1, for example, 2-methyl pentene-1 yields methyl isopropenyl ketone. Furthermore, normal pentene-1, isopentene-1, alpha hexenes, alpha heptenes and alpha octenes, dienes, butadienes, isoprene and pentadiene, may be used.

However, with ethylene there is no allyl carbon to be oxidized and hence, the olefin is reliberated as ethylene. In this instance, the method acquires an additional value, thereby providing a means of separating and purifying ethylene from a feed containing ethylene, saturated hydrocarbons, or other gases such as oxygen, nitrogen, hydrogen or mixtures of two carbon and lighter hydrocarbons.

I claim:

A process of manufacturing methyl vinyl ketone which comprises absorbing a mixture of butene-1 and butene-2 in an aqueous sulfuric acid dispersion of mercuric sulfate to form a butene-1 complex, and selectively oxidizing butene-1 to methyl vinyl ketone without corresponding oxidation or hydration of butene-2 by effecting said absorption at a temperature below about 60° F.; selectively releasing butene-2 from its absorbent by raising the temperature of said aqueous dispersion together with its absorbed olefins to the boiling point through the range above about 60° F. substantially instantaneously to limit butene-2 residence time at temperatures above 60° F. and inhibit oxidation of said butene-2; and decomposing said complex to form methyl vinyl ketone.

WILLIAM G. TOLAND.

REFERENCES CITED

The following references are of record in the file of this patent:

UNITED STATES PATENTS

| Number | Name | Date |
|---|---|---|
| 1,315,541 | Curme | Sept. 9, 1919 |
| 2,348,931 | Schulze | May 16, 1944 |
| 2,388,510 | Voge | Nov. 6, 1945 |
| 2,398,685 | Yale et al. | Apr. 16, 1946 |
| 2,403,671 | Matuszak | July 9, 1946 |
| 2,424,186 | Packie | July 15, 1947 |